United States Patent

[11] 3,525,313

| [72] | Inventor | Arthur H. Jordan<br>Ardmore, Pennsylvania |
|---|---|---|
| [21] | Appl. No. | 734,476 |
| [22] | Filed | June 4, 1968 |
| [45] | Patented | Aug. 25, 1970 |
| [73] | Assignee | Honeywell Inc.<br>Minneapolis, Minnesota<br>a corporation of Delaware |

[54] CONTROLLING APPARATUS
10 Claims, 2 Drawing Figs.

[52] U.S. Cl. .................................................. 116/133,
74/89.15, 116/125, 116/136.5
[51] Int. Cl. .................................................. F16k 37/00
[50] Field of Search .......................................... 116/136.5;
74/89.14, 89.15; 33/154C, 170; 116/133, 125

[56]        References Cited
UNITED STATES PATENTS

| 429,069 | 5/1890 | Stuart | 33/154(C)UX |
| 726,287 | 4/1903 | Hatch | 33/148(E)X |
| 2,660,147 | 11/1953 | Bowditch | 116/136.5 |

*Primary Examiner* — Louis R. Prince
*Assistant Examiner* — Frederick Shoon
*Attorney* — Arthur H. Swanson and J. Shaw Stevenson

ABSTRACT: A control device having a control pointer arm which may be manually adjusted for either making a rapid coarse adjustment or a fine adjustment of the pointer along a set point indicating scale. A rod is fixedly mounted adjacent the indicating end of the pointer arm and a spring to retain this rod in slidable engagement with a threaded shaft except when conditions require the pointer arm to be rapidly moved along the set point indicator scale. A manually rotatable disc is fixed to the end of the screw shaft for moving the rod therealong when making the fine set point adjustment.

Patented Aug. 25, 1970
3,525,313
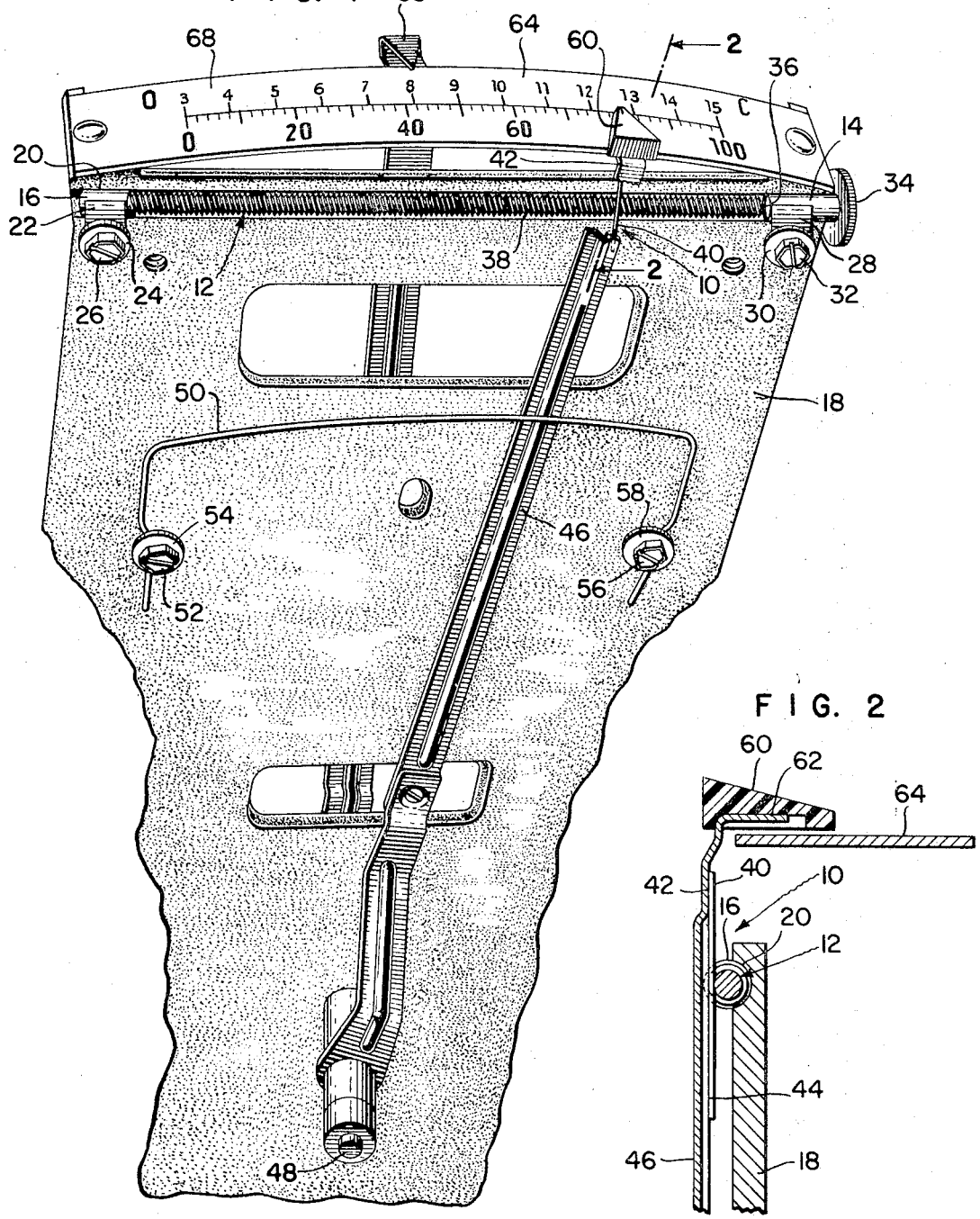
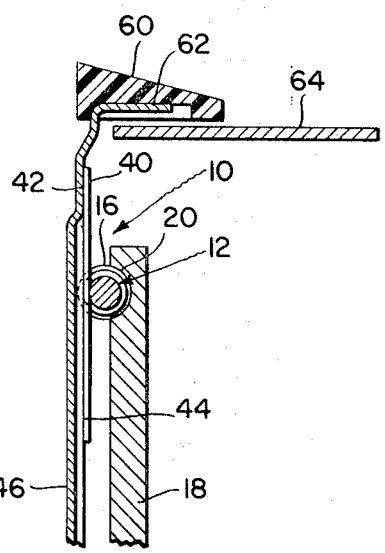
INVENTOR.
ARTHUR H. JORDAN
BY
John Shaw Stevenson
AGENT.

CONTROLLING APPARATUS

It is an object of the present invention to disclose an apparatus to convert rotary motion of a screw shaft whose longitudinal axis is located in a horizontal plane into an arcuate motion of a member connected for rotation about a vertical axis.

More specifically it is the object of the present invention to disclose a rod that is fixed to one side of an indicator arm and that engages the top side surfaces of adjacent threads on a manually rotatable screw shaft so that a highly accurate fine degree of movement can be transmitted to the indicator arm to move it in a precise position on an indicating scale.

It is another object of the present invention to employ an indicator of the aforementioned type in combination with an N-shaped spring biasing means to retain e.g. a set point indicator arm of a controller in physical contact with the screw shaft, while a fine adjustment is being made and which will also permit the arm to be rapidly slid toward either end of the screw shaft in a case where a dangerous condition on the process being controlled arises and a rapid change becomes imperative.

It is also an object of the present invention to disclose a set point adjusting indicator of the aforementioned type which can alternatively make a coarse adjustment by merely lifting the set point indicating arm and its associated rod clear of the screw shaft, moving it along in spaced relation above the shaft and allowing it to again reengage the shaft at a different desired position thereon.

It is another object of the present invention to disclose a set point adjusting means which can be more rapidly adjusted and precisely zeroed in on a fine adjustment than other presently commercially available set point adjusting apparatus.

A better understanding of the present invention may be had from the following detailed description when read in connection with the accompanying drawings in which:

FIG. 1 shows a partially broken away view of the underside of a spring biased pointer and showing how a rod mounted on the top surface of an arm attached to this pointer engages a screw shaft that is rotatably mounted on the underside surface of a process control indicating instrument; and FIG. 2 is a sectional side elevation view taken through a portion of the arm in FIG. 1 and shows how the rod portion of the arm is engaged with the aforementioned screw shaft.

The set point indicating pointer adjusting apparatus 10 used to control a process as shown in FIG. 1 represents one typical example of an apparatus for converting horizontal rotary motion of a shaft into arcuate motion of a member about a vertical axis which can be beneficially employed to control a process.

This apparatus is comprised of a screw shaft 12 fixedly mounted at its opposite front side end portion by means of bearings 14, 16 on an indicating controller chassis 18.

Each bearing 14, 16 is retained in a fixed position in a groove 20 of the chassis 18 by means of two sets of clip, washer and screw connections 22, 24, 26; 28, 30, 32.

A knurled disc 34 is fixedly press fitted on the right end of the shaft 12 to provide a convenient means by which this shaft 12 can be manually rotated.

A bowl shaped ring member 36 is mounted on the shaft 12 between the bearing 14 and a threaded portion 38 on the shaft 12 to provide a separator therebetween as the shaft 12 is rotated in the fixed bearing 18 by the disc 34.

The threaded portion 38 of shaft 12 is preferably of a fine threaded variety to provide a micrometer adjustment in order that member 40 constructed of a rigid rod or a taut wire can be brought into engagement with the top inner side portions of any two adjacent threads which form the thread portion 38 as is best shown in FIG. 2.

The opposite ends of this rod 40 are connected by any two connecting means such as a spot weld material 42, 44 to an indicating arm 46. The rod 40 is thus shown positioned at a selected angle with respect to the center line of the arm 46 that will enable the rod 40 to maintain its engagement with two adjacent side portions of the screw thread while the rotation of the disc 34 moves the rod 40 and its arm 46 about its stationary pivot 48 and between the opposite ends of the thread portion 38 of the shaft 12.

Each end of an N-shaped spring 50 is shown fixedly attached by means of respective screw and spring-washer connections 52, 54; 56, 58 to the chassis 18. A portion between the ends of the spring 50 is shown in spring biased contact with the arm 46 to maintain its rod 40 in contact with the threaded portion 38 of the shaft 12.

As is best shown in FIG. 2 the outer end of the arm 46 has a pointer 60 fixedly attached by welding material 62 for traversing along and in spaced relation to a set point indicating scale 64 and in turn is fixedly connected to the chassis 18.

A process variable pointer 66 is employed to indicate the condition of a variable regulating an industrial process on the indicating scale 68.

In the event that a dangerous condition should occur, e.g. in an industrial process being controlled, and it is desired to make a rapid change in the set point (control point) about which the process is being controlled, commonly referred to as a scram condition, an operator can place his finger over one side of the pointer 60 and rapidly move it by one continuous slamming action along the top of the threaded portion to a position that is at an extreme end of the scale 64 so that the dangerous process condition can be immediately corrected.

After the aforementioned coarse adjustment has been made the arm can then be positioned to an exact fine micrometer adjustment on the scale 64 by rotating the disc 34 to the exact position desired on the scale.

Another way of repositioning the pointer 60 along the scale 64 is to mechanically lift the pointer against the bias of the spring 50 and move it in spaced relation to the threaded portion 38 of the shaft 12 to either end position of the shaft and then release it. When the pointer 60 is released the bias of the N-shaped spring 50 will again be employed to force the rod into physical engagement with the sides of the adjacent threads of the threaded portion 38 of the shaft 12. When the pointer 60 is placed in this latter mentioned position it can be precisely zeroed in on the exact set point on scale 64 by rotating the disc 34 in the desired direction.

Whenever the set point pointer on set point indicating arm 46 is rotated about its pivot the arm 46 will cause a motion to be transmitted to regulate the position of a pressure regulating device, not shown. This regulating device may be e.g. a conventional flapper of a flapper nozzle fluid regulating unit which controls the amount of air being applied to a control valve in a flow line of the aforementioned process.

If the tip portion 60 and its associated set point pointer 46 is pushed to one extreme position on the scale 64 the regulator unit, not shown, will immediately apply a maximum amount of pressure to the control valve in a flow conduit of the process to immediately affect a closing thereof and the cutting off of the fluid through this flow conduit.

If the tip portion 60 and its associated set point pointer 46 is pushed to the extreme opposite portion on the scale 64 the regulator unit not shown will then immediately exhaust all of the fluid pressure being applied by the regulator to its associated control valve and this will cause the valve in a flow line of the aforementioned process to be moved to a fully opened position.

It can be seen from the aforementioned description that the apparatus described herein performs an important function by providing a mechanism to rapidly move a set point pointer arm to either end portion of the scale so that adverse conditions which arise in a process can be immediately corrected.

I claim:

1. An apparatus to convert a rotary motion of a first shaft rotating about a horizontal axis into arcuate motion of a second shaft rotating about a vertical axis, comprising threads extending along a portion of the first shaft, said first shaft being operably connected for rotation about said horizontal axis, a member connected to the second shaft for arcuate movement therewith about the vertical axis, a rod fixedly mounted on said member, said rod being connected for traversing movement along the threads on the first shaft as said first shaft is rotated and to thereby affect said arcuate movement of the member and said second shaft.

2. The apparatus as defined in claim 1 wherein the rod is mounted at a preselected angle with respect to the longitudinal axis of the member that will enable the rod to engage the upper side wall portions of any two adjacent threads formed on the threaded shaft at a minimal change in height as the rod is moved from the center to either end of the first shaft.

3. The apparatus as defined in claim 1 wherein a spring is operably connected to apply a biasing force to the member to retain the rod in contact between two adjacent threads of the shaft while said traversing movement of the arm along the shaft is occurring.

4. The apparatus as defined in claim 1 wherein a disc is mounted on one end of the threaded shaft for introducing the manual rotation thereto, the member is an indicator arm and wherein said arm is provided with a pointer at one end thereof, that is positioned to move along an indicating scale as the manual rotation of the threaded shaft is occurring.

5. The apparatus as defined in claim 1 wherein a disc is mounted on one end of the threaded shaft for introducing the manual rotation thereto, the member is an indicator arm, said arm is provided with a pointer at one end thereof that is positioned to move along an indicating scale as the manual rotation of the threaded shaft is occurring, and wherein the rotatable movement of the disc is employed to provide a fine linear adjustment of the indicator arm along the indicating scale.

6. The apparatus as defined in claim 1 wherein the rod is mounted at a selected angle with respect to the longitudinal axis of the member that will enable the rod to engage the upper side wall portions of any two adjacent threads formed on the threaded shaft at a minimal change in height as the rod is moved from the center to either end of the first shaft and wherein a resilient means is employed to retain the rod mounted on the member in spring biased contact with the threaded shaft for movement therealong as said rotation of the shaft is occurring.

7. The apparatus as defined in claim 1 wherein the rod is mounted at a selected angle with respect to the longitudinal axis of the member that will enable the rod to engage the upper side wall portions of any two adjacent threads formed on the threaded shaft at a minimal change in height as the rod is moved from the center to either end of the first shaft and wherein a resilient means is employed to retain the rod mounted on the member in spring biased contact with the threaded shaft for movement therealong as said rotation of the threaded shaft is occurring and wherein the resilient means is of an N-shaped construction having stationary open end portions and the remaining portion in contact with the indicating arm to bias the rod mounted thereon into the spring biased engagement with the threaded shaft.

8. The apparatus as defined in claim 1 wherein a spring is mounted to apply a biasing force to the member to retain the rod in contact between successive pairs of adjacent threads of the shaft while said traversing movement of the member along the threaded shaft is occurring, and wherein the member is an indicating arm manually movable away from said threaded shaft so as to disengage from the threaded shaft while the spring is acting thereon to allow manual movement of a part that is integral with the indicating arm along an indicating scale.

9. The apparatus as defined in claim 1 wherein a spring is operably connected to apply a biasing force to the member to retain the rod in contact between adjacent threads of the first shaft while said traversing movement of the member along the shaft is occurring, the member is an indicating arm and said construction of the apparatus enables the rod on the indicating arm to be manually repositioned from one location on the threaded shaft to another by manually raising a pointer that is integral with the arm against the bias of the spring until the rod is clear of the shaft and is moved in spaced relation to the shaft and therealong to said last mentioned position.

10. The apparatus as defined in claim 1 wherein a spring is operably connected to apply a biasing force to the member to retain the rod in contact between successive pairs of adjacent threads of the first shaft while said traversing movement of the member along the first shaft is occurring, the member is an indicating arm, the rod of the indicating arm is mounted for manual movement away from and along the threaded shaft while the spring is acting thereon and a pointer part that is integral with the arm whereby the arm and its pointer part are employed as a set point indicator, the nonpointer end of the indicator arm is adapted to rotate a stem of a fluid pressure regulator and effect a change in the magnitude of the output pressure produced thereby while movement of the arm is occurring and the rod is moved from one threaded shaft position to another.